United States Patent
Fukuyama et al.

(10) Patent No.: US 10,320,009 B2
(45) Date of Patent: Jun. 11, 2019

(54) DEFORMATION ABSORPTION MEMBER AND FUEL CELL

(71) Applicants: Nissan Motor Co., Ltd., Yokohama-shi, Kanagawa (JP); NHK Spring Co., Ltd., Yokohama-shi, Kanagawa (JP)

(72) Inventors: Yosuke Fukuyama, Kanagawa (JP); Takeshi Shiomi, Kanagawa (JP); Yusuke Terada, Kanagawa (JP); Norihiro Tajima, Kanagawa (JP)

(73) Assignees: Nissan Motor Co., Ltd., Yokohama (JP); NHK Spring Co., Ltd., Yokohama (JP)

( * ) Notice: Subject to any disclaimer, the term of this patent is extended or adjusted under 35 U.S.C. 154(b) by 5 days.

(21) Appl. No.: 14/901,367

(22) PCT Filed: Jun. 30, 2014

(86) PCT No.: PCT/JP2014/067445
§ 371 (c)(1),
(2) Date: Dec. 28, 2015

(87) PCT Pub. No.: WO2015/012064
PCT Pub. Date: Jan. 29, 2015

(65) Prior Publication Data
US 2016/0141643 A1 May 19, 2016

(30) Foreign Application Priority Data
Jul. 22, 2013 (JP) .................................. 2013-152019

(51) Int. Cl.
*H01M 8/247* (2016.01)
*H01M 8/0206* (2016.01)
(Continued)

(52) U.S. Cl.
CPC ....... *H01M 8/0297* (2013.01); *H01M 8/0247* (2013.01); *H01M 8/2404* (2016.02);
(Continued)

(58) Field of Classification Search
CPC ............. H01M 8/0297; H01M 8/0247; H01M 8/0206; H01M 8/2404; H01M 8/247; H01M 2008/1095
See application file for complete search history.

(56) References Cited

U.S. PATENT DOCUMENTS 5,152,695 A * 10/1992 Grabbe ................ H01R 13/245
439/66
7,435,108 B1 * 10/2008 Eldridge ............ G01R 1/06727
439/66
(Continued)

FOREIGN PATENT DOCUMENTS

JP          05335024 A  * 12/1993  .......... H01M 8/0271
JP       2002367665 A  * 12/2002  .......... B60L 11/1881
(Continued)

*Primary Examiner* — Gregg Cantelmo
(74) *Attorney, Agent, or Firm* — Global IP Counselors, LLP (57) ABSTRACT

A deformation absorption member for a fuel-cell-stack disposed between an anode side separator and a cathode side separator. The deformation absorption member includes a thin-board-like base material, and a plurality of raised pieces in which extension portions extended from proximal ends are arranged in a grid pattern. Each raised piece of the plurality of raised pieces is formed in a non-rectangular shape in which the width of the extension portion is shorter than the width of the proximal end, and plurality of raised pieces are configured so that the directions of the extension portions of mutually adjacent raised pieces are alternately arranged, and positions of the proximal ends of the mutually adjacent raised pieces are arranged in at least overlapping positions.

8 Claims, 9 Drawing Sheets (51) Int. Cl.
*H01M 8/0247* (2016.01)
*H01M 8/0297* (2016.01)
*H01M 8/1018* (2016.01)
*H01M 8/2404* (2016.01)

(52) U.S. Cl.
CPC .......... *H01M 8/247* (2013.01); *H01M 8/0206* (2013.01); *H01M 2008/1095* (2013.01)

(56) References Cited

U.S. PATENT DOCUMENTS

2007/0134949 A1* 6/2007 Dittmann ............. H01R 12/714
439/66
2009/0098432 A1* 4/2009 Rosenberg ............. F28F 13/12
429/444

FOREIGN PATENT DOCUMENTS

| JP | 4432518 B2 | | 1/2010 |
| JP | 2012248460 A | * | 12/2012 |
| JP | 2013-97982 A | | 5/2013 |
| WO | 2007/088551 A2 | | 8/2007 |

* cited by examiner

DEFORMATION ABSORPTION MEMBER AND FUEL CELL

CROSS-REFERENCE TO RELATED APPLICATIONS

This application is a U.S. National stage application of International Application No. PCT/JP2014/067445, filed Jun. 30, 2014, which claims priority to Japanese Patent Application No. 2013-152019 filed in Japan on Jul. 22, 2013, the contents of each of which are herein incorporated by reference.

BACKGROUND

Field of the Invention

The present invention relates to a deformation absorption member and a fuel-cell-stack.

Background Art

Conventionally, a fuel-cell-stack is configured by alternately laminating a separator and a membrane electrode assembly. Since, in a fuel-cell-stack, high output can be obtained in accordance with the number of laminations of the separators and the membrane electrode assemblies, increasing the number of laminations is desirable. Conduction resistance can be reduced and a desired battery performance can be achieved by sufficiently putting the plurality of laminated separators and the membrane electrode assemblies in close contact with each other.

In a separator unit comprising an anode side separator and a cathode side separator, the portion of the flow channel for a fuel gas (hydrogen) and the cooling water of the anode side separator, and the portion of the flow channel for the oxidant gas (air containing oxygen or pure oxygen) and the cooling water of the cathode side separator, are formed from fine convex/concave shapes, and have high dimensional tolerances.

Accordingly, there is a configuration to arrange a pressurizing plate corresponding to a deformation absorption member comprising a spring function between the flow channel portion of the anode side separator and the flow channel portion of the cathode side separator of the separator unit. By using such a deformation absorption member, uniformly applying pressure becomes possible without damaging the convex/concave shaped portion that becomes the flow channel, even if a high pressing force is applied to the separator unit (for example refer to Japanese Patent No. 4432518).

SUMMARY

Here, a technique has been in demand, in which, even if a load is applied to a deformation absorption member disposed inside a separator unit by applying pressure thereto, the load that can be received by the raised pieces of the deformation absorption member can be increased, without damaging the separator unit or the deformation absorption member themselves.

In order to solve the problem described above, an object of the present invention is to provide a deformation absorption member that is capable of increasing the load that a raised piece can receive, and a fuel-cell-stack in which the deformation absorption member is disposed.

The deformation absorption member according to the present invention which achieves the object above is used disposed between an anode side separator and a cathode side separator. The deformation absorption member is made of a thin-board-like base material, and comprises a plurality of raised pieces in which extension portions extended from the proximal ends are arranged in a grid pattern. The raised piece is formed in a non-rectangular shape in which the width of the extension portion is shorter than the width of the proximal end, and is configured so that the directions of the extension portions of mutually adjacent raised pieces are alternately arranged, and the positions of the proximal ends of mutually adjacent raised pieces are arranged in at least overlapping positions.

A fuel-cell-stack according to the present invention which achieves the object above comprises a separator unit and a deformation absorption member. The separator unit comprises an anode side separator and a cathode side separator. The deformation absorption member is disposed between the anode side separator and the cathode side separator, is made of a thin-board-like base material, and comprises a plurality of raised pieces in which extension portions extended from the proximal ends are arranged in a grid pattern. The raised piece is formed in a non-rectangular shape in which the width of the extension portion is shorter than the width of the proximal end, and is configured so that the directions of the extension portions of the mutually adjacent raised pieces are alternately arranged, and the positions of the proximal ends of the mutually adjacent raised pieces are arranged in at least overlapping positions.

BRIEF DESCRIPTION OF THE DRAWINGS

Referring now to the attached drawings which form a part of this original disclosure.

DETAILED DESCRIPTION OF THE EMBODIMENTS

Embodiments according to the present invention will be described below, with reference to the appended drawings. In the explanations of the drawings, the same elements are given the same codes, and overlapping explanations are omitted. The sizes and ratios of the members in the drawing are exaggerated for the convenience of explanation, and may be different from the actual sizes and ratios.

Embodiments

The fuel-cell-stack 1 according to the embodiment and the deformation absorption member 20 used disposed in the fuel-cell-stack 1 will be described with reference to FIG. 1-FIG. 9.

Figure 1:
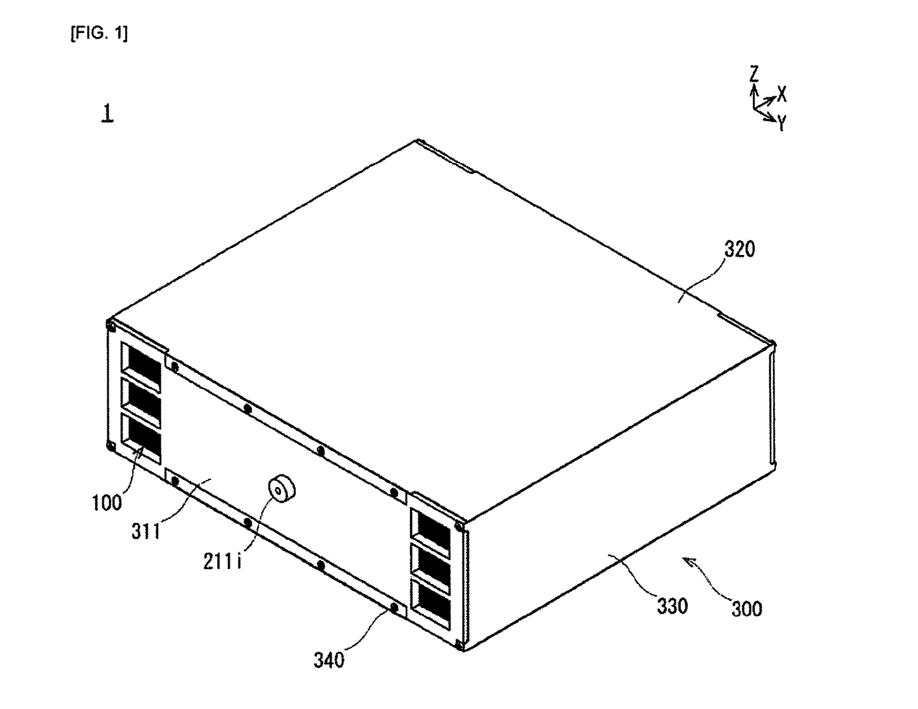
FIG. 1 is a perspective view illustrating the fuel-cell-stack according to an embodiment.
Figure 2:
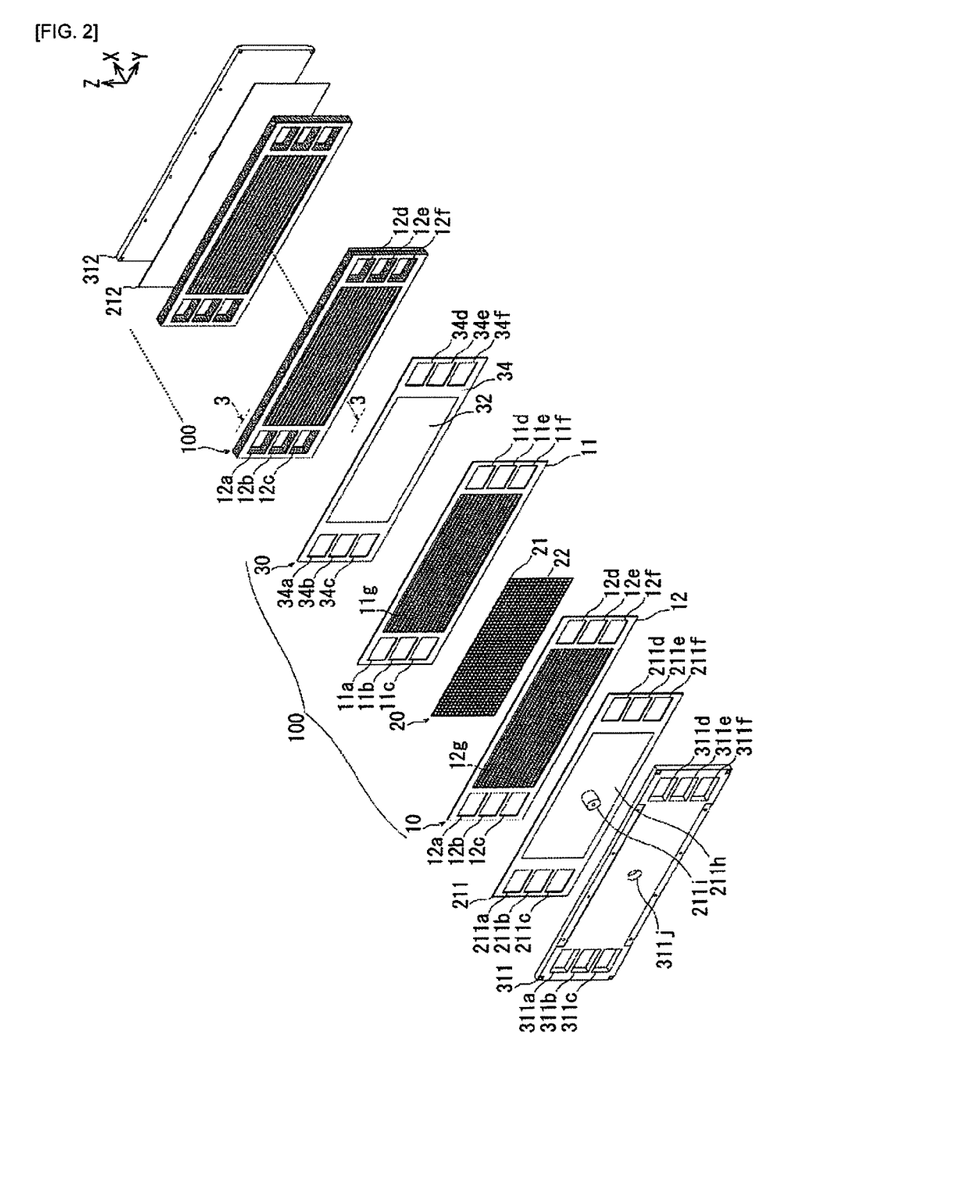
FIG. 2 is an exploded perspective view illustrating a part of the fuel-cell-stack according to the embodiment, exploded per each component member.
Figure 3:
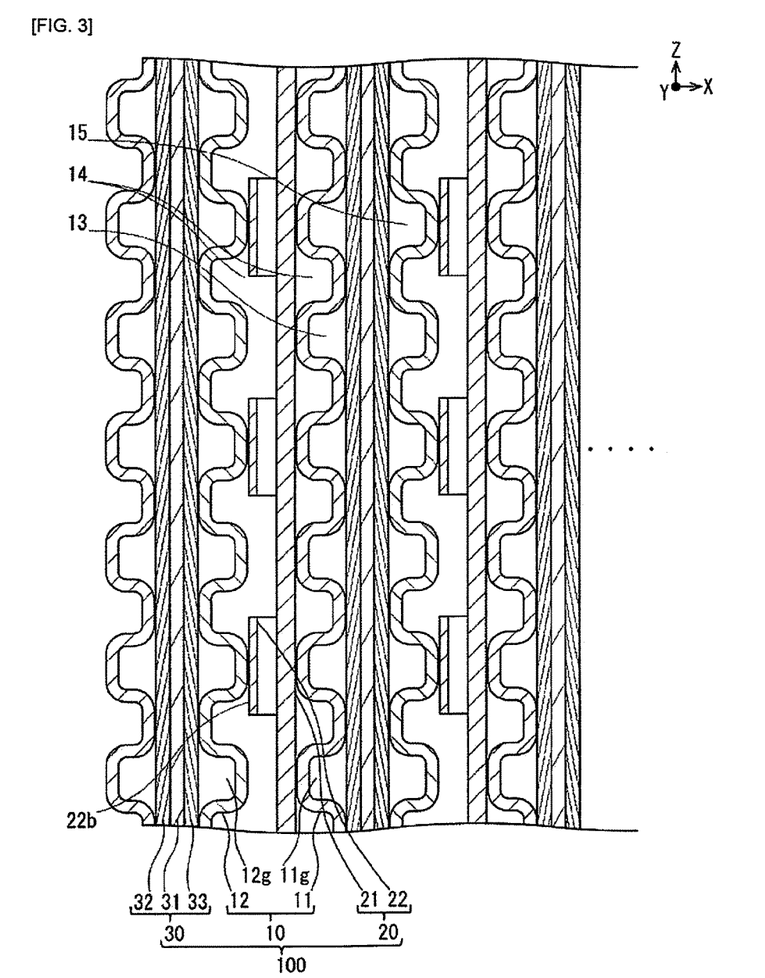
FIG. 3 is a cross-sectional view illustrating the separator unit, the deformation absorption member, and a part of the membrane electrode assembly, of the fuel-cell-stack according to the embodiment.
Figure 4:
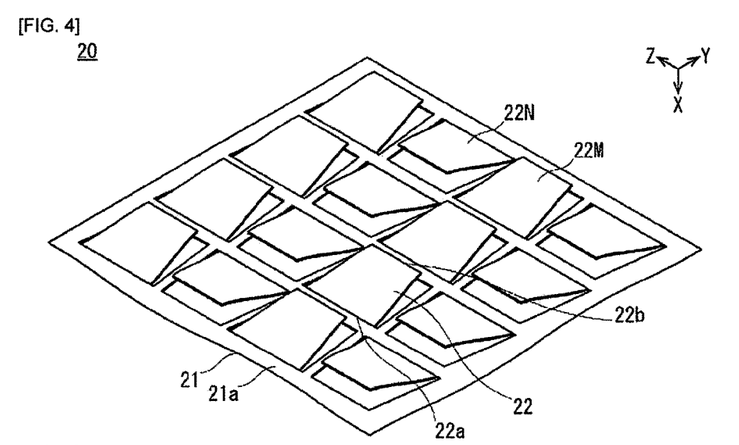
FIG. 4 is a perspective view illustrating the deformation absorption member of the fuel-cell-stack according to the embodiment.
Figure 5:
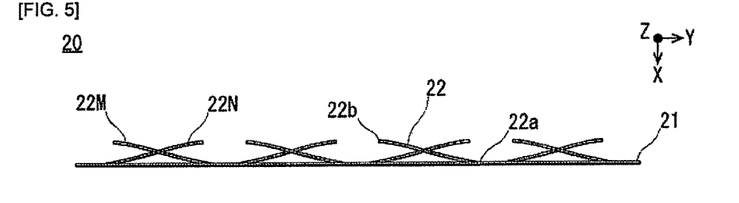
FIG. 5 is a side view illustrating the deformation absorption member of the fuel-cell-stack according to the embodiment.

FIG. 1 is a perspective view illustrating the fuel-cell-stack 1 according to the embodiment. FIG. 2 is an exploded perspective view illustrating a part of the fuel-cell-stack 1, exploded per each component member. FIG. 3 is a cross-sectional view illustrating the separator unit 10, the deformation absorption member 20, and a part of the membrane electrode assembly 30, of the fuel-cell-stack 1. FIG. 3 shows along the 3-3 line in FIG. 2. FIG. 4 is a perspective view illustrating the deformation absorption member 20 of the fuel-cell-stack 1. FIG. 5 is a side view illustrating the deformation absorption member 20 of the fuel-cell-stack 1.

Figure 7:
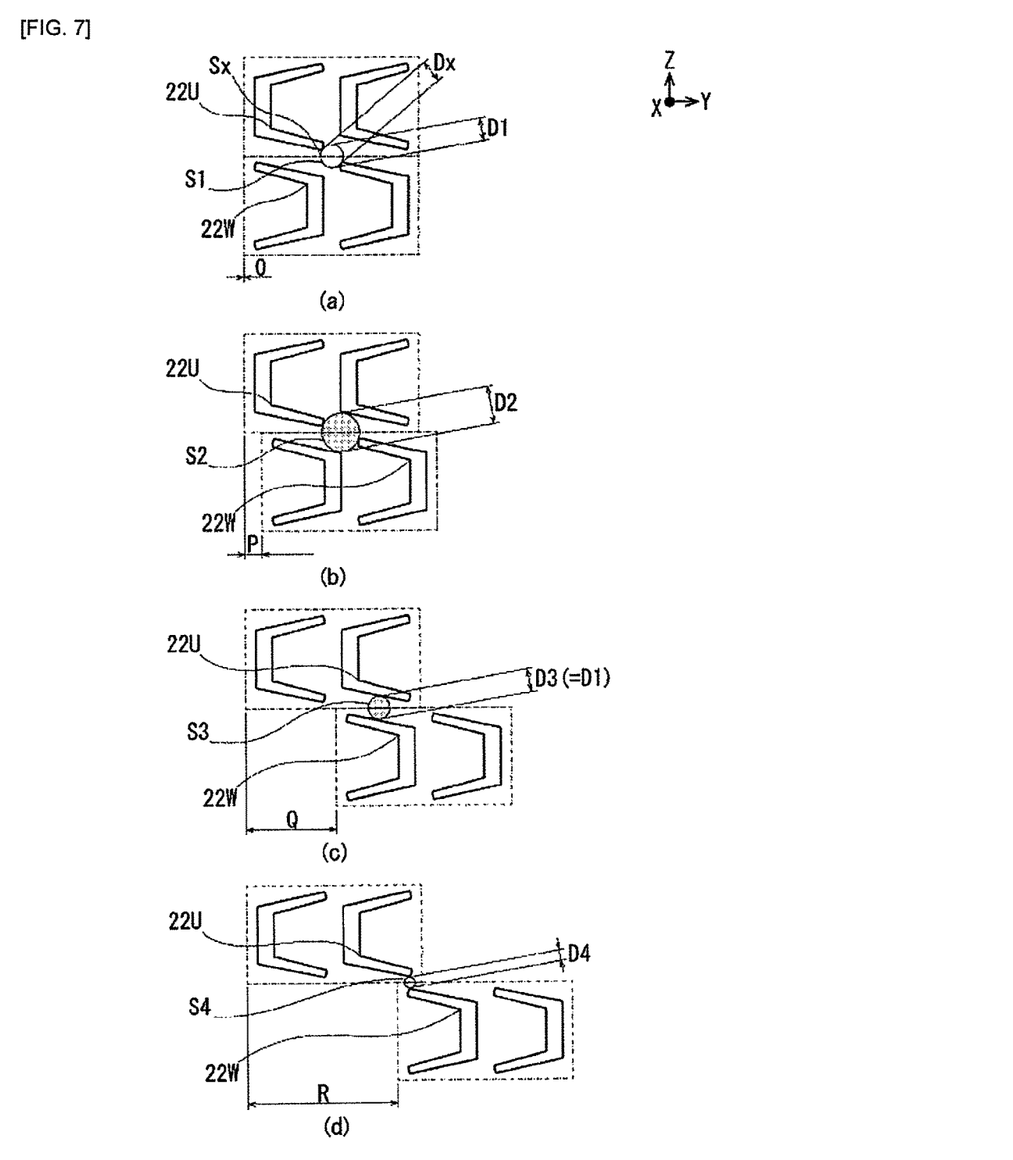
FIGS. 7A-7D are schematic views illustrating the interval between the raised pieces of the adjacent rows in the deformation absorption member of the fuel-cell-stack according to the embodiment.
Figure 8:
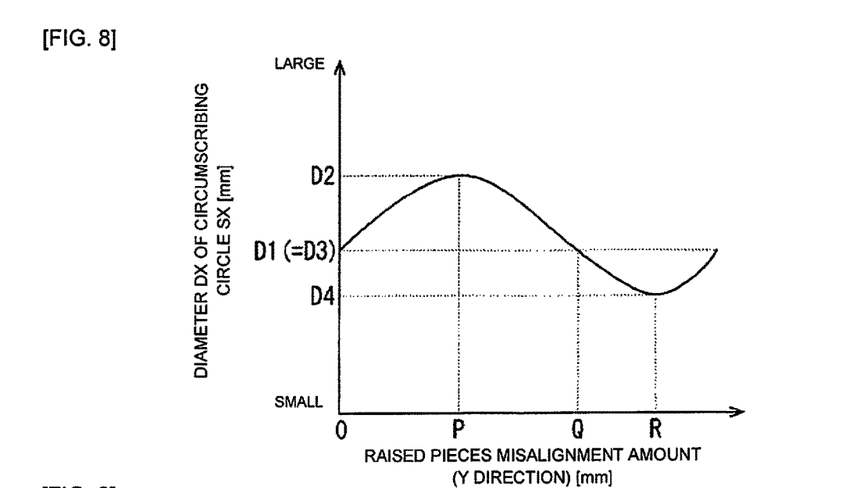
FIG. 8 is a view illustrating the relationship between the misalignment amount and the diameter of a circumscribing circle between the raised pieces of the adjacent rows in the deformation absorption member of the fuel-cell-stack according to the embodiment.
Figure 9:
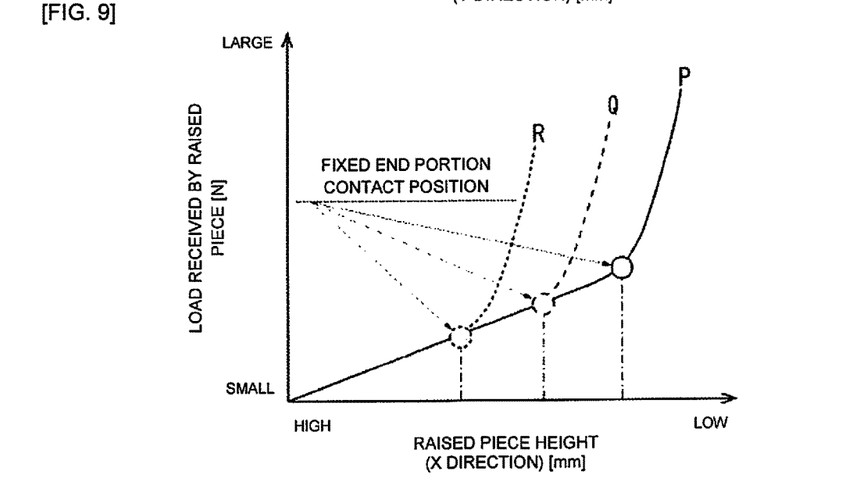
FIG. 9 is a view illustrating the characteristics to withstand the load when the interval between the raised pieces of the adjacent rows are varied in the deformation absorption member of the fuel-cell-stack according to the embodiment.

FIGS. 6A and 6B are views illustrating the close contact state between the raised pieces 22 in the deformation absorption member 20 of the fuel-cell-stack 1. FIGS. 7A-7D are schematic views illustrating the interval between the raised pieces 22 of adjacent rows in the deformation absorption member 20 of the fuel-cell-stack 1. FIG. 8 is a view illustrating the relationship between the misalignment amount and the diameter Dx of a circumscribing circle Sx between the raised pieces 22 of the adjacent rows illustrated in FIGS. 7A-7D in the deformation absorption 20 member of the fuel-cell-stack 1. FIG. 9 is a view illustrating the characteristics to withstand the load when the interval between the raised pieces 22 of adjacent rows are varied in the deformation absorption member 20 of the fuel-cell-stack 1.

The fuel-cell-stack 1 according to the embodiment comprises the fuel cells 100 which generate the power, a pair of collector plates 211 and 212 for transmitting the power generated by the fuel cells 100 to the outside, and a chassis 300 that holds a plurality of fuel cells 100 laminated together and a pair of collector plates 211 and 212. Each configuration of the fuel-cell-stack 1 will be explained in order below.

The fuel cell 100 is illustrated in FIG. 1-FIG. 3, and generates power from the supplied fuel gas (hydrogen) and the oxidant gas (air containing oxygen or pure oxygen), in a state in which a plurality thereof are laminated together.

The fuel cell 100 comprises a separator unit 10, a deformation absorption member 20, and a membrane electrode assembly 30. Each member included in the fuel cell 100 will be described below.

The separator unit 10 is illustrated in FIG. 2 and FIG. 3, isolates the adjacent membrane electrode assemblies 30 while conducting the power that is generated in the membrane electrode assembly 30, and comprises flow channels for cooling the water and the fuel gas (hydrogen) or the oxidant gas (air containing oxygen or pure oxygen). The separator unit 10 comprises an anode side separator 11 and a cathode side separator 12. The anode side separator 11 abuts an anode 32 of the membrane electrode assembly 30. The anode side separator 11 is made of a conductive metal material, and is formed into a thin plate shape that is larger than the anode 32.

A plurality of convex/concave shapes are formed at the regular intervals in the center of the anode side separator 11 so as to configure a flow channel portion 11g to flow the fuel gas (hydrogen) and the cooling water at intervals, as illustrated in FIG. 3. Of the convex/concave shapes, the anode side separator 11 uses the closed space formed by contacting the anode 32 as an anode gas flow channel 13 for supplying hydrogen to the anode 32. On the other hand, of the convex/concave shapes, the anode side separator 11 uses the closed space formed between the cathode side separator 12, interposing the deformation absorption member 20, as a cooling water flow channel 14 for supplying cooling water.

The anode side separator 11 is formed from some rectangles, and the through-holes corresponding to a cathode gas inlet 11a, a cooling fluid inlet 11b, and an anode gas inlet 11c are opened on one end in the longitudinal direction. Similarly, the through-holes corresponding to an anode gas outlet 11d, a cooling fluid outlet 11e, and a cathode gas outlet 11f are opened on the other end of the anode side separator 11 in the longitudinal direction.

The cathode side separator 12 abuts a cathode 33 of the membrane electrode assembly 30. The cathode side separator 12 is made of a conductive metal material, and is formed into a thin plate shape that is larger than the cathode 33.

A plurality of convex/concave shapes are formed at regular intervals in the center of the cathode side separator 12 so as to configure a flow channel portion 12g to flow the oxidant gas (air containing oxygen or pure oxygen) and the cooling water at the intervals, as illustrated in FIG. 3. The convex/concave shapes are made by alternately combining the U-shapes, or alternately combining the semi-circular shapes. Of the convex/concave shapes, the cathode side separator 12 uses the closed space formed by contacting the cathode 33 as a cathode gas flow channel 15 for supplying oxidant gas to the cathode 33. On the other hand, of the convex/concave shapes, the cathode side separator 12 uses the closed space formed between the cathode side separator 12, interposing the deformation absorption member 20, as a cooling water flow channel 14 for supplying cooling water. That is, in the adjacent fuel cells 100, a cooling water flow channel 14 of an anode side separator 11 of one fuel cell 100 and a cooling water flow channel 14 provided to a cathode side separator 12 of the other fuel cell 100 form one cooling water flow channel.

The cathode side separator 12 is made of some rectangles, and the through-holes corresponding to a cathode gas inlet 12a, a cooling fluid inlet 12b, and an anode gas inlet 12c are opened on one end in the longitudinal direction. Similarly, the through-holes corresponding to an anode gas outlet 12d, a cooling fluid outlet 12e, and a cathode gas outlet 12f are opened on the other end of the cathode side separator 12 in the longitudinal direction.

The deformation absorption member 20 is illustrated in FIG. 2-FIG. 7D, and absorbs manufacturing errors in the convex/concave shapes which form the fuel gas and the cooling water flow channels of the anode side separator 11 and the cathode side separator 12 by deforming itself at the time of assembling the fuel-cell-stack 1. In addition, the deformation absorption member 20 absorbs any displacements in the lamination direction X, caused by an expansion of the membrane electrode assembly 30 when absorbing the supplied medium, by deforming itself. In addition, the deformation absorption member 20 absorbs displacements in the lamination direction X, caused by a thermal expansion of a separator unit 10 that is heated by an adjacent membrane electrode assembly 30, by deforming itself during an operation of the fuel cell 100. Therefore, putting the plurality of laminated fuel cells 100 into close contact with each other by applying a high pressure is possible. The closer the plurality of laminated fuel cells 100 are in contact with each other, the more the conduction resistance between the fuel cells 100 is reduced, to improve the power generation efficiency.

The deformation absorption member 20 is made of a metal having electrical conductivity, and is formed in a thin plate shape, as illustrated in FIG. 4. The deformation absorption member 20 is disposed between the anode side separator 11 and the cathode side separator 12, is made of a thin-board-like base material 21, and comprises a plurality of raised pieces 22 in which the extension portions extended from the proximal ends are arranged in a grid pattern. That is, in the deformation absorption member 20, the raised pieces 22 are made by punching out the U-shapes from the base material 21, corresponding to one thin plate, which are then raised and cantilevered, and arranged in a grid pattern, as illustrated in FIG. 4 and FIG. 5. Since the raised pieces 22 comprise a cantilever structure with respect to the base material 21, the pieces have the function of a spring that can be elastically deformed.

The raised piece 22 is formed in a non-rectangular shape in which the width of the extension portion is shorter than the width of the proximal end, as illustrated in FIG. 4. That is, the raised piece 22 is formed in a non-rectangular shape in which the width of a fixed end portion 22a on the proximal end side of the raised piece 22 disposed one surface 21a of the base material 21, is relatively longer than the width of a free end portion 22b of an extension portion side, which extends along one direction Y from the fixed end portion 22a. Here, since the moment that the raised piece 22 receives is the product of the load and the distance, the moment will be relatively larger at a position which is at a distance from the load point, which corresponds to the free end portion 22b. Therefore, by forming the raised piece 22 in a non-rectangular shape, the moment is equalized by relatively increasing the width of the side where the moment is large.

In addition, in the raised pieces 22, the directions of the extension portions of the mutually adjacent raised pieces 22 are alternately arranged. That is, the raised pieces 22 are formed so that the directions of the free end portions 22b are alternated per each row, in a plurality of rows along another direction Z which intersects the one direction Y, as illustrated in FIG. 4 and FIG. 5.

Figure 6:
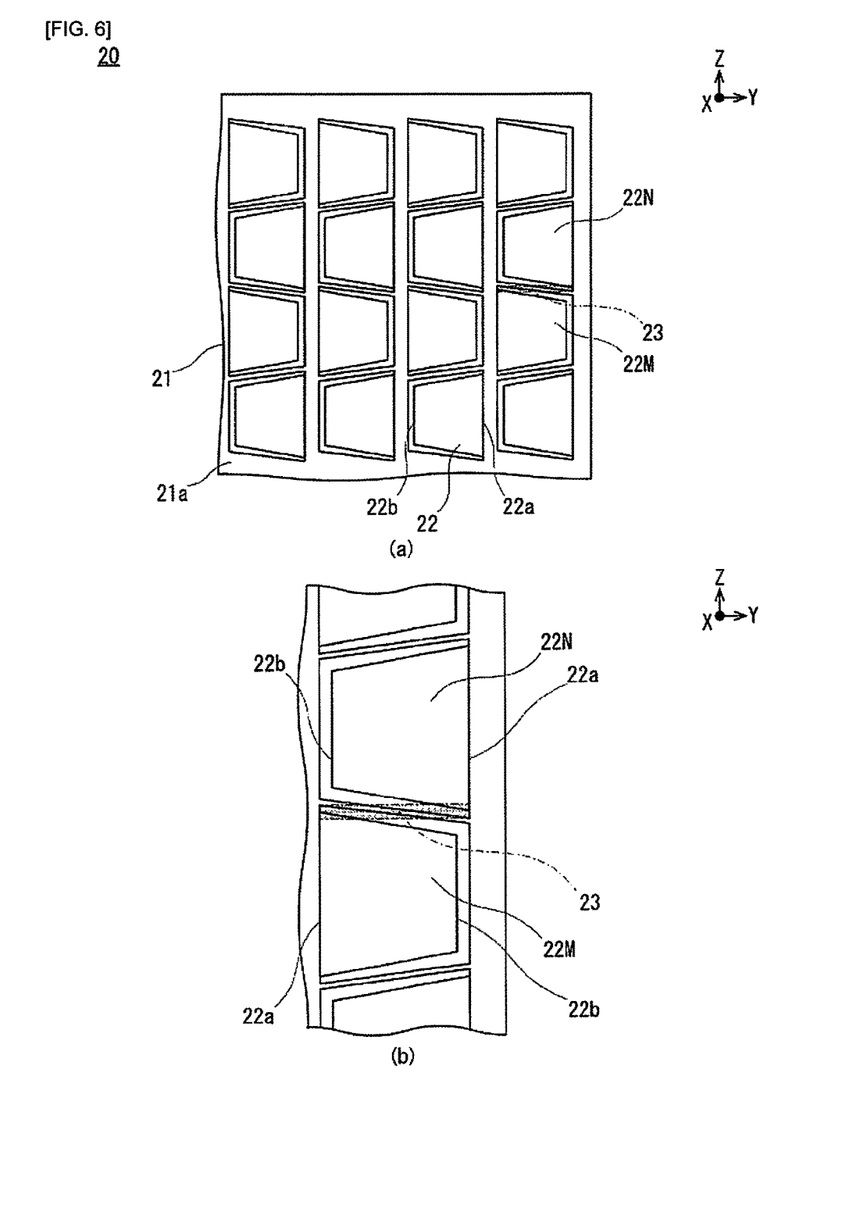
FIGS. 6A and 6B are views illustrating the close contact state between the raised pieces in the deformation absorption member of the fuel-cell-stack according to the embodiment.

Additionally, in the raised pieces 22, the positions of the proximal ends of mutually adjacent raised pieces 22 are arranged in at least overlapping positions, as illustrated in FIG. 6. In other words, in the raised pieces 22, the position of one end of the proximal end (the fixed end portion 22a) of one raised piece 22M, and the position of one end of the proximal end (the fixed end portion 22a) of another raised piece 22N, are overlapped in a region 23, as illustrated in FIG. 6(b). Here, in the raised piece 22 illustrated in FIG. 6 as an example, since the unillustrated cut pieces are gener- ated in the periphery thereof when punching out from the base material 21, there is an interval between the raised piece 22 and the base material 21. On the other hand, when punching out U-shapes from the base material 21, cutting can be performed so that the cut pieces are not generated in the periphery thereof so that the interval between the raised piece 22 and the base material 21 is small. When the unillustrated cut pieces are generated, the one end of the proximal end (the fixed end portion 22a) of the raised piece 22 corresponds to the end portion including the interval caused by the cut pieces. In the modified examples 1-4 of the embodiment described below as well, when the unillustrated cut pieces are generated, the one end of the proximal end (the fixed end portion) of the raised piece corresponds to the end portion including the interval caused by the cut pieces.

In the deformation absorption member 20, the free end portion 22b on the extension portion side extended from the fixed end portion 22a on the proximal end side of the raised pieces 22 disposed on one surface 21a of the base material 21, abuts against the cathode side separator 12, as illustrated in FIG. 3.

In the deformation absorption member 20, the plurality of raised pieces 22 are formed in a grid pattern with respect to the base material 21, so that the diameter Dx of the circumscribing circle Sx will be equal to or greater than the diameter D1 of a circumscribing circle S1, as illustrated in FIGS. 7A-7D and FIGS. 8A and 8B. The diameter Dx of the circumscribing circle Sx corresponds to a diameter that circumscribes one raised piece 22U and another raised piece 22W, which is adjacent in the other direction Z. The diameter D1 of the circumscribing circle S1 corresponds to a diameter that circumscribes one raised piece 22U and another raised piece 22W, in a case in which a plurality of raised pieces 22 are arranged in a grid pattern having equal intervals on each of the two dimensions of one direction Y and another direction Z.

The one raised piece 22U and the other raised piece 22W illustrated in FIG. 7A are arranged in a grid pattern having equal intervals on each of the two dimensions of one direction Y and another direction Z. The diameter of a circumscribing circle S1 that circumscribes each of the one raised piece 22U and the other raised piece 22W in FIG. 7A is defined as the diameter D1. Here, the raised pieces 22 that are adjacent to each other in the other direction Z are shifted so as to separate from each other in the order of P, Q, and R (corresponding to the horizontal axis in FIGS. 8A and 8B), as illustrated in FIG. 7B-FIG. 7B. The one raised piece 22U and the other raised piece 22W illustrated in FIG. 7B illustrate a state in which the misalignment amount illustrated in FIGS. 8A and 8B corresponds to P, and the diameter of the circumscribing circle S2 which circumscribes therewith, is defined as the diameter D2. The one raised piece 22U and the other raised piece 22W illustrated in FIG. 7C illustrate a state in which the misalignment amount illustrated in FIGS. 8A and 8B corresponds to Q, and the diameter of the circumscribing circle S3 which circumscribes therewith, is defined as the diameter D3. The diameter D3 of the circumscribing circle S3 is the same as the diameter D1 of the circumscribing circle S1. The one raised piece 22U and the other raised piece 22W illustrated in FIG. 7D illustrate a state in which the misalignment amount illustrated in FIGS. 8A and 8B corresponds to R, and the diameter of the circumscribing circle S4 which circumscribes therewith, is defined as diameter D4. The diameters of the circumscribing circles are in a relation of D4<D1=D3<D2

When an excessive load is applied to the free end portion 22b of the raised piece 22, which abuts the cathode side separator 12, the fixed end portion 22a side is lifted up and comes in contact with the cathode side separator 12. Increasing the load that can be received by the raised piece 22 while avoiding such a situation is desirable. Keeping the distance between adjacent raised pieces 22 within a certain distance while ensuring the load that the raised piece 22 can receive from the cathode side separator 12 to be a certain value or greater is especially preferable. As illustrated in FIG. 9, the height of the raised piece 22 in the position at which the fixed end portion 22a is lifted up and comes in contact with the cathode side separator 12 is lower, when the misalignment amount illustrated in FIG. 7 is P, Q, and R, in that order. The load that can be received by the raised piece 22 is increased as the height thereof in decreased, in a range in which the fixed end portion 22a is not put in contact with the cathode side separator 12. That is, the load that can be received by the raised piece 22 from the separator unit 10 can be increased more, when the misalignment amount is P, Q, and R, in that order.

The membrane electrode assembly 30 is illustrated in FIG. 2 and FIG. 3, and generates electric power by chemically reacting the supplied oxygen and hydrogen. The membrane electrode assembly 30 is formed by joining an anode 32 and a cathode 33 so as to face each other via an electrolyte membrane 31. The membrane electrode assembly 30 is commonly referred to as the MEA (membrane electrode assembly). The electrolyte membrane 31 is, for example, made of a solid polymer material, and is formed in a thin plate shape. For example, a fluorine-based resin which conducts hydrogen ions and has good electrical conductivity in a wetted state is used as the solid polymer material. The anode 32 is configured by laminating an electrode catalyst layer, a water-repellent layer, and a gas diffusion layer, and is formed in a thin plate shape that is slightly smaller than the electrolyte membrane 31. The cathode 33 is configured by laminating an electrode catalyst layer, a water-repellent layer, and a gas diffusion layer, and is formed in a thin plate shape with the same size as the anode 32. The electrode catalyst layers of the anode 32 and the cathode 33 include a polymer electrolyte and an electrode catalyst in which the catalyst component is carried on a conductive carrier. The gas diffusion layers of the anode 32 and the cathode 33 are formed from a carbon cloth, a carbon paper, or a carbon felt, which are woven with the yarns comprising the carbon fibers that have a sufficient gas diffusibility and conductivity.

The membrane electrode assembly 30 comprises a frame 34. The frame 34 integrally holds the outer perimeters of the electrolyte membrane 31, the anode 32, and the cathode 33. The frame 34 is made of, for example, a resin having the electrical insulating properties, and is formed with an external shape that is the same as the external shape of the outer perimeter portion of the separator unit 10. Through-holes corresponding to a cathode gas inlet 34a, a cooling fluid inlet 34b, and an anode gas inlet 34c are opened on one end of the frame 34 in the longitudinal direction. Similarly, through-holes corresponding to an anode gas outlet 34d, a cooling fluid outlet 34e, and a cathode gas outlet 34f are opened on the other end of the frame 34 in the longitudinal direction.

A plurality of fuel cells 100 need to be laminated together in a state of being sealed to each other. Accordingly, the outer perimeters of the adjacent fuel cells 100 are sealed with a sealing member. For example, a thermosetting resin is used as the sealing member. The thermosetting resin is selected from, for example, a phenol resins, an epoxy resins, an unsaturated polyester, or the like.

The pair of collector plates 211 and 212 are illustrated in FIG. 2, and transmit the power generated by the fuel cells 100 to the outside.

The pair of collector plates 211 and 212 are respectively disposed on the two ends of the plurality of fuel cells 100 laminated together. The external shape of the pair of collector plates 211 and 212, with the exception of some of the shape, is the same as the external shape of the membrane electrode assembly 30 with a slightly thicker layer thickness. Among the pair of collector plates 211 and 212, through-holes corresponding to a cathode gas inlet 211a, a cooling fluid inlet 211b, and an anode gas inlet 211c are opened on the one end of only the collector plate 211 in the longitudinal direction. Similarly, through-holes corresponding to an anode gas outlet 211d, a cooling fluid outlet 211e, and a cathode gas outlet 211f are opened on the other end of only the collector plate 211 in the longitudinal direction. The pair of collector plates 211 and 212 include a collector portion 211h, etc., in the center.

The collector portion 211h, etc., of the pair of the collector plates 211 and 212 is made of a conductive member that does not permeate a gas, such as a dense carbon, and is formed in a thin plate shape that is slightly smaller than the outer shapes of the anode 32 and the cathode 33. The pair of the collector portions 211h, etc., abut with the anode 32 or the cathode 33 of the membrane electrode assembly 30 disposed on the outermost of the plurality of laminated fuel cells 100. A conductive cylindrical protrusion 211i, etc., protrudes from one surface of the collector portion 211h, etc. The protrusion 211i, etc., extend through the through-holes 311j, etc., of a pair of end plates 311 and 312 of the chassis 300 described below.

The chassis 300 is illustrated in FIG. 1 and FIG. 2, and holds the plurality of fuel cells 100 laminated together and the pair of the collector plates 211 and 212, in a state of being in close contact with each other.

The chassis 300 comprises a pair of the end plates 311 and 312, a pair of the fastening plates 320, a pair of the reinforcing plates 330, and the screws 340. Each member included in the chassis 300 will be described below. The pair of the end plates 311 and 312 sandwich and bias the pair of collector plates 211 and 212, disposed on the two ends of the plurality of fuel cells 100 laminated together. The external shape of the pair of the collector plates 311 and 312, with the exception of some of the shape, is the same as the external shape of the membrane electrode assembly 30 with an increased layer thickness. The pair of the end plates 311 and 312 are, for example, made of a metal, and an insulator is disposed in a portion that abuts with the pair of the collector plates 211 and 212. Among the pair of the end plates 311 and 312, the through-holes corresponding to a cathode gas inlet 311a, a cooling fluid inlet 311b, and an anode gas inlet 311c are opened on one end of only the end plate 311 in the longitudinal direction. Similarly, the through-holes corresponding to an anode gas outlet 311d, a cooling fluid outlet 311e, and a cathode gas outlet 311f are opened on the other end of only the end plate 311 in the longitudinal direction. A through-hole 311j, etc., for extending through the protrusion 211i, etc., of the pair of collector plates 211 and 212 are opened on the pair of end plates 311 and 312.

The pair of the fastening plates 320 are made of, for example, a metal, and are formed in a plate shape. The pair of the fastening plates 320 hold the pair of the end plates 311 and 312 from both sides in the longitudinal direction so as to face each other. The pair of the reinforcing plates 330 are made of, for example, a metal, and are formed in a plate shape that is more elongated than the pair of the fastening plates 320. The pair of the reinforcing plates 330 hold the pair of the end plates 311 and 312 from both sides in the lateral direction so as to face each other. The pair of the fastening plates 320 and the pair of the reinforcing plates 330 are fixed to the pair of the end plates 311 and 312 by a plurality of screws 340.

According to the deformation absorption member 20 and the fuel-cell-stack 1 according to the embodiment described above, the following actions and effects can be achieved.

The deformation absorption member 20 according to the embodiment is used disposed between an anode side separator 11 and a cathode side separator 12. The deformation absorption member 20 is made of a thin-board-like base material 21, and comprises a plurality of raised pieces 22 in which extension portions extended from the proximal ends are arranged in a grid pattern. The raised piece 22 is formed in a non-rectangular shape in which the width of the extension portion is shorter than the width of the proximal end, and is configured so that the directions of the extension portions of the mutually adjacent raised pieces 22 are alternately arranged, and the positions of the proximal ends of the mutually adjacent raised pieces 22 are arranged in at least overlapping positions.

The fuel-cell-stack 1 according to the embodiment comprises a separator unit 10 and a deformation absorption member 20. The separator unit 10 comprises an anode side separator 11 and a cathode side separator 12. The deformation absorption member 20 is disposed between the anode side separator 11 and the cathode side separator 12. The deformation absorption member 20 is made of a thin-board-like base material 21, and comprises a plurality of raised pieces 22 in which the extension portions extended from the proximal ends are arranged in a grid pattern. The raised piece 22 is formed in a non-rectangular shape in which the width of the extension portion is shorter than the width of the proximal end, and is configured so that the directions of the extension portions of mutually adjacent raised pieces 22 are alternately arranged, and the positions of the proximal ends of the mutually adjacent raised pieces 22 are arranged in at least overlapping positions.

According to the deformation absorption member 20 and the fuel-cell-stack 1 configured in this manner, the raised piece 22 is formed in a non-rectangular shape in which the width of the extension portion is shorter than the width of the proximal end, and is configured so that the directions of the extension portions of the mutually adjacent raised pieces 22 are alternately arranged, and the positions of the proximal ends of the mutually adjacent raised pieces 22 are arranged in at least overlapping positions. According to such a configuration, in the deformation absorption member 20, the density of the raised piece 22 can be increased, by increasing the number of raised pieces 22 per unit area of the base material 21. Accordingly, it is possible to increase the load that can be received per unit area by the raised piece 22 of the deformation absorption member 20.

In addition, in the deformation absorption member 20 according to the embodiment, the plurality of raised pieces 22 can be arranged in a grid pattern having equal intervals on each of the two dimensions of one (first) direction Y and another (second) direction Z which is orthogonal to the one direction Y, and the directions of the extension portions can be alternately arranged along the other direction Z, as illustrated in FIGS. 7A-7D. Here, the raised pieces can be formed on the base material 21 so that the diameter Dx of a circumscribing circle Sx that circumscribes each of a first raised piece 22U, and another raised piece 22W which is adjacent to the one raised piece 22U along the one direction Y and the other direction Z will be equal to or greater than a diameter D1 of a circumscribing circle S1 when the other raised piece 22W is disposed at an equal distance from the one raised piece 22U along the one direction Y and the other direction Z. That is, the diameter Dx of the circumscribing circle Sx is defined so that D1=D3 or greater, and equal to or less than D2.

According to a deformation absorption member 20 configured in this manner, the distance between the adjacent raised pieces 22 can be kept within a certain distance, while ensuring the load that the raised piece 22 can receive from the cathode side separator 12 is a certain value or greater. The withstood load of the one raised piece 22U and the other raised piece 22W adjacent in the other direction Z can be increased the most, especially when forming the diameter D2 in the circumscribing circle S2 illustrated in FIG. 7B. That is, the circumscribing circle S2 (the diameter D2) illustrated in FIG. 7B and FIGS. 8A and 8B correspond to when the misalignment amount of the raised pieces 22 of the adjacent rows is P; in such a case, more load can be received, as illustrated in FIG. 9. FIG. 9 illustrates that when the misalignment amount of the raised pieces 22 of the adjacent rows is P (corresponding to the circumscribing circle S2, the diameter D2), the load that the raised piece 22 can receive is relatively the largest. Specifically, as illustrated in FIG. 9, the height of the raised piece 22 in the position at which the fixed end portion 22a is lifted up and comes in contact with the cathode side separator 12 is lower, when the misalignment amount illustrated in FIGS. 7A-7D is P, Q, and R, in that order. The load that can be received by the raised piece 22 is increased as the height thereof is decreased, in a range in which the fixed end portion 22a is not put in contact with the cathode side separator 12. Therefore, of the misalignment amounts P, Q, and R, the load that can be received by the raised piece 22 from the cathode side separator 12 can be increased the most when the misalignment amount is P, without putting the fixed end portion 22a in contact with the cathode side separator 12. At least, when the misalignment amount of raised pieces 22 of the adjacent rows is Q (corresponding to the circumscribing circle S3, the diameter D3) or greater, the load that the raised piece 22 can receive becomes equal to or greater than the average value, as illustrated in FIGS. 8A and 8B and FIG. 9.

Furthermore, the deformation absorption member 20 according to the embodiment may be configured so that the raised pieces 22 adjacent along the one direction Y are formed with an interval with which the proximal end (fixed end portion 22a) is not displaced and put in contact with the anode side separator 11 or the cathode side separator 12, when the extension portion (the free end portion 22b) is pressed by the anode side separator 11 or the cathode side separator 12 and is bent or curved.

According to a deformation absorption member 20 configured in this manner, the adjacent raised pieces 22 can be prevented from contacting each other in actual use. Therefore, even if the fixed end portion 22a side is lifted up, the fixed end portion 22a can be prevented from coming into contact with the cathode side separator 12. That is, the raised piece 22 can be prevented from becoming in a state of a both ends supported beam, at the free end portion 22b and the fixed end portion 22a.

Modified Example of the Embodiments

The deformation absorption members 40, 50, 60, and 70 that are used disposed in a fuel-cell-stack according to the modified examples of the embodiment will be described with reference to FIG. 10-FIG. 13.

Figure 10:
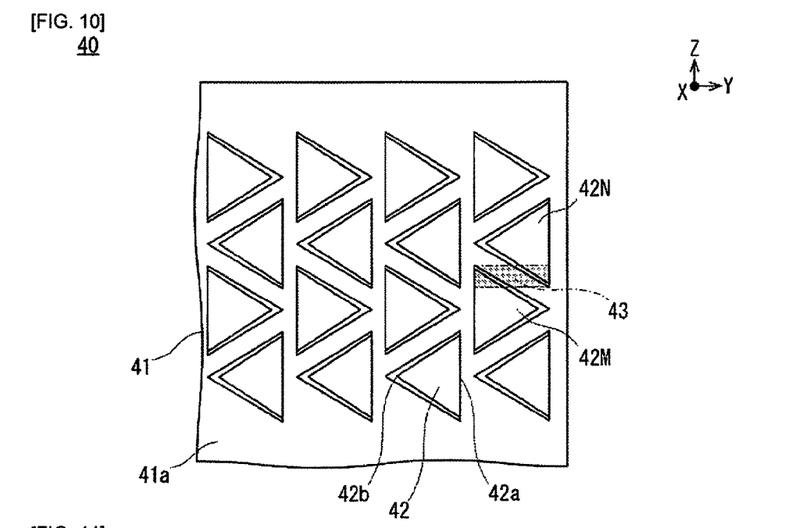
FIG. 10 is a plan view illustrating the deformation absorption member of the fuel-cell-stack according to a first modified example of the embodiment.
Figure 11:
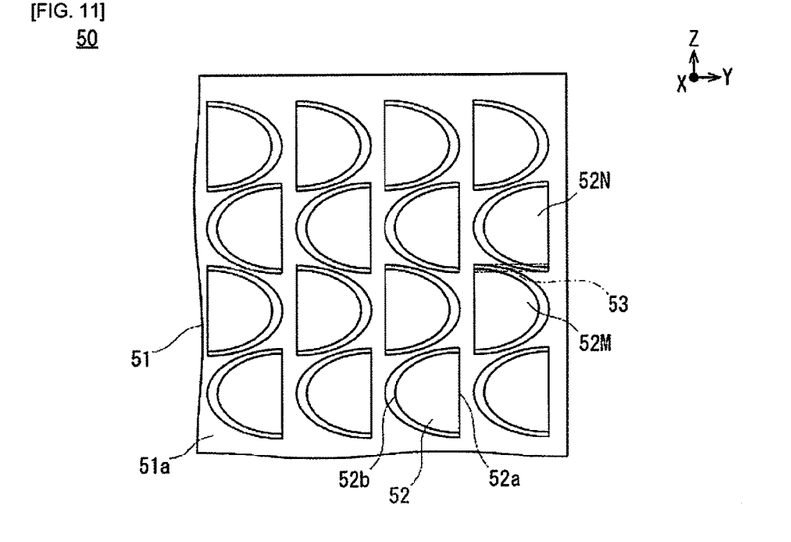
FIG. 11 is a plan view illustrating the deformation absorption member of the fuel-cell-stack according to a second modified example of the embodiment.
Figure 12:
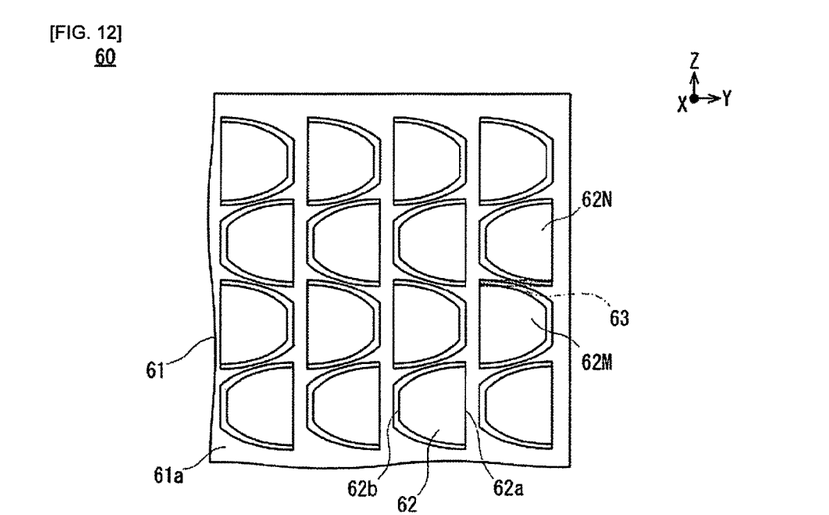
FIG. 12 is a plan view illustrating the deformation absorption member of the fuel-cell-stack according to a third modified example of the embodiment.
Figure 13:
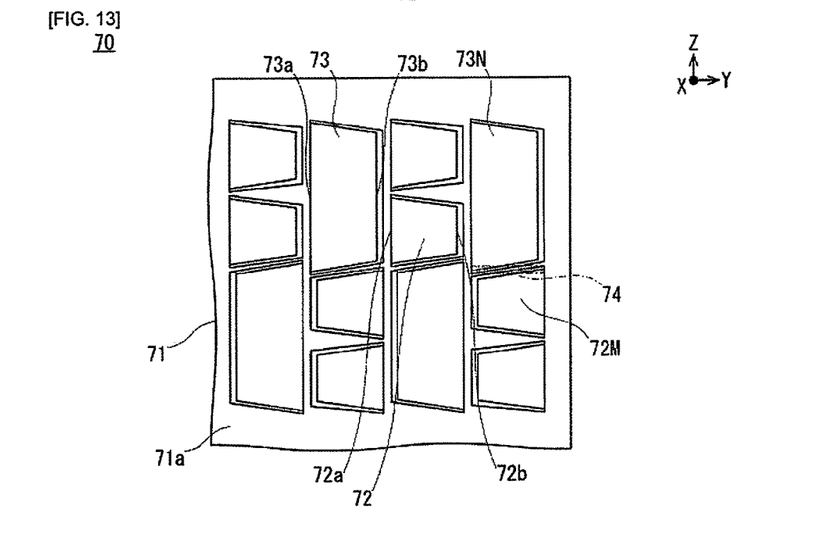
FIG. 13 is a plan view illustrating the deformation absorption member of the fuel-cell-stack according to a fourth modified example of the embodiment.

FIG. 10 is a plan view illustrating the deformation absorption member 40 of the fuel-cell-stack according to a first modified example. FIG. 11 is a plan view illustrating the deformation absorption member 50 of the fuel-cell-stack according to a second modified example. FIG. 12 is a plan view illustrating the deformation absorption member 60 of the fuel-cell-stack according to a third modified example. FIG. 13 is a plan view illustrating the deformation absorption member 70 of the fuel-cell-stack according to a fourth modified example.

The deformation absorption members 40, 50, 60 and 70 according to the modified examples of the embodiments are different from the deformation absorption member 20 according to the embodiment described above in that the shape of the raised piece is formed in a shape that is different from a trapezoidal shape.

In the modified examples of the embodiment, the same codes are used for configurations that are the same as the embodiment described above, and the explanations thereof are omitted.

In the deformation absorption member 40 according to the first modified example illustrated in FIG. 10, the raised pieces 42 raised from one surface 41a of the base material 41 in a grid pattern are each formed in a triangular shape. That is, the raised piece 42 is formed in a triangular shape, in which the fixed end portion 42a thereof is a straight base and the free end portion 42b thereof is the apex. The free end portion 42b of the raised piece 42 abuts the cathode side separator 12. The position of one end of the proximal end (the fixed end portion 42a) of one raised piece 42M, and the position of one end of the proximal end (the fixed end portion 42a) of another raised piece 42N, are overlapped in a region 43.

In the deformation absorption member 50 according to the second modified example illustrated in FIG. 11, the raised pieces 52 raised from one surface 51a of the base material 51 are each formed in a semicircular shape. That is, the raised piece 52 is formed in a semicircular shape, in which the fixed end portion 52a thereof is a straight base and the free end portion 52b thereof is the apex of the semicircle. The free end portion 52b of the raised piece 52 abuts the cathode side separator 12. The position of one end of the proximal end (the fixed end portion 52a) of one raised piece 52M, and the position of one end of the proximal end (the fixed end portion 52a) of another raised piece 52N, are overlapped in a region 53.

In the deformation absorption member 60 according to the second modified example illustrated in FIG. 12, the raised pieces 62 raised from one surface 61a of the base material 61 are each formed in a polygonal shape. That is, the raised piece 62 is formed in a polygonal shape, in which the fixed end portion 62a thereof is a straight base and the free end portion 62b thereof is formed as a straight side disposed on the extension portion that is projected from the fixed end portion 62a in an arcuate shape. The free end portion 62b of the raised piece 62 abuts the cathode side separator 12. The position of one end of the proximal end (the fixed end portion 62a) of one raised piece 62M, and the position of one end of the proximal end (the fixed end portion 62a) of another raised piece 62N, are overlapped in a region 63.

In the deformation absorption member 70 according to the fourth modified example illustrated in FIG. 13, the raised pieces 72 and the raised pieces 73 which are made from trapezoidal shapes with different sizes are provided in combination. In the deformation absorption member 70, two relatively smaller raised pieces 72 are disposed in parallel along the other direction Z which intersects with the one direction Y. The free end portions 72b of the raised pieces 72 disposed in parallel are aligned along the one direction Y. The relatively large raised pieces 73 are arranged to be adjacent to two raised pieces 72 along the one direction Y. The free end portions 73b of the raised pieces 73 are formed along the one direction Y. The free end portion 72b of the raised piece 72 abuts the cathode side separator 12. The position of the one end of the proximal end (the fixed end portion 72a) of the one raised piece 72M, and the position of the one end of the proximal end (the fixed end portion 72a) of another raised piece 73N, are overlapped in a region 74.

According to the deformation absorption members 40, 50, 60, and 70 according to the modified examples of the embodiment described above, the following actions and effects can be achieved in addition to the actions and effects according to the embodiment described above.

The raised pieces respectively provided to the deformation absorption members 40, 50, 60, and 70 according to the modified examples of the embodiment, are formed in a triangular, a semicircular, a polygonal, or a non-rectangular shape that is a combination thereof.

According to the deformation absorption members 40, 50, 60, and 70 of a fuel-cell-stack configured in this manner, the shape of the raised piece can be freely determined to be in accordance with the pressing force of the separator unit 10 which applies pressure from both sides of the lamination direction X, or the specification of the cathode side separator 12 to which is abutted the free end portion of the raised piece. That is, even if the raised pieces are formed from some triangles, semicircles, polygons, or a non-rectangular shape that is a combination thereof, the density of the raised pieces on one surface of the base material can be increased, in the same way as when forming the non-rectangular shapes such as a trapezoidal shape. In particular, the raised pieces 22, 62, 72, and 73 in which the free end portions are configured to come in line contact with the cathode side separator 12, are able to prevent stress from being concentrated between the cathode side separator 12. On the other hand, for example, the raised pieces 42 formed in a triangular shape can be disposed more densely on the base material 41.

Besides the above, various modifications to the present invention based on the configurations described in the Claims are possible, which also belong in the scope of the present invention.

Not all of the raised pieces 22 disposed on the base material 21 need to be formed in a non-rectangular shape in which the width of the extension portion is shorter than the width of the proximal end, and configured so that the directions of the extension portions of the mutually adjacent raised pieces 22 are alternately arranged, and the positions of the proximal ends of the mutually adjacent raised pieces 22 are arranged in at least the overlapping positions; at least a part of the raised pieces 22 should satisfy the configurations above.

The invention claimed is:

1. A deformation absorption member for a fuel-cell-stack disposed between an anode side separator and a cathode side separator, the deformation absorption member comprising:
   a substantially planar base material; and
   a plurality of first and second raised pieces in which extension portions extended from proximal ends are arranged in a grid pattern in which two adjacent first raised pieces and a second raised piece are alternatingly arranged in a direction perpendicular to a direction in which the extension pieces extend, the proximal end of the second raised piece being substantially as wide as a total width of the proximal ends of two adjacent first raised pieces, and each raised piece of the plurality of first and second raised pieces is formed in a non-rectangular shape in which the width of the extension portion is shorter than the width of the proximal end, and the plurality of first and second raised pieces are configured so that the directions of the extension portions of each of the first raised pieces are alternately arranged to the directions of each of the extension portions of the second raised pieces in a direction perpendicular to the direction in which the extension pieces extend along the base material, positions of the proximal ends of each of the first raised pieces adjacent a second raised piece in the direction perpendicular to the direction in which the extension pieces extend are arranged in at least overlapping positions in the direction in which the extension portions extend.

2. The deformation absorption member according to claim 1, wherein the grid pattern has equal intervals on each of two dimensions of a first direction and a second direction which is orthogonal to the first direction, and directions of the extension portions are alternately arranged along the second direction, and a diameter of a first circumscribing circle that circumscribes a first raised piece of the plurality of raised pieces and a second raised piece of the plurality of raised pieces which is adjacent to the first raised piece along the first direction and the second direction will be equal to or greater than a diameter of a second circumscribing circle when the second raised piece is disposed at an equal distance from the first raised piece along the first direction and the second direction.

3. The deformation absorption member according to claim 1, wherein each raised piece of the plurality of raised pieces adjacent along a first direction is formed with an interval with which the proximal end of each raised piece is not displaced and in contact with at least one of the anode side separator and the cathode side separator, when the extension portion is pressed by at least one of the anode side separator and the cathode side separator and is bent or curved.

4. The deformation absorption member according to claim 1, wherein the plurality of raised pieces are formed from at least one of triangles, semicircles, polygons, or a non-rectangular shape that is a combination thereof.

5. The deformation absorption member according to claim 2, wherein each raised piece of the plurality of raised pieces adjacent along the first direction is formed with an interval with which the proximal end of each raised piece is not displaced and in contact with at least one of the anode side separator and the cathode side separator, when the extension portion is pressed by at least one of the anode side separator and the cathode side separator and is bent or curved.

6. The deformation absorption member according to claim 2, wherein the plurality of raised pieces are formed from at least one of triangles, semicircles, polygons, or a non-rectangular shape that is a combination thereof.

7. The deformation absorption member according to claim 3, wherein the plurality of raised pieces are formed from at least one of triangles, semicircles, polygons, or a non-rectangular shape that is a combination thereof.

8. A fuel-cell-stack, comprising:
a separator unit comprising an anode side separator and a cathode side separator; and
a deformation absorption member disposed between the anode side separator and the cathode side separator, the deformation absorption member being formed from a substantially planar base material, and including a plurality of first and second raised pieces in which extension portions extended from proximal ends thereof are arranged in a grid pattern in which two adjacent first raised pieces and a second raised piece are alternatingly arranged in a direction perpendicular to a direction in which the extension pieces extend, the proximal end of the second raised piece being substantially as wide as a total width of the proximal ends of two adjacent first raised pieces, each raised piece of the plurality of first and second raised pieces being formed in a non-rectangular shape in which the width of the extension portion is shorter than the width of the proximal end, and the plurality of first and second raised pieces being configured so that the directions of the extension portions of each of the first raised pieces are alternately arranged to the directions of each of the extension portions of the second raised pieces in a direction perpendicular to the direction in which the extension portions extend along the base material, positions of the proximal ends of each of the first raised pieces adjacent a second raised piece in the direction perpendicular to the direction in which the extension pieces extend are arranged in at least overlapping positions in the direction in which the extension portions extend.

* * * * *